United States Patent
Au et al.

(10) Patent No.: US 10,255,160 B2
(45) Date of Patent: Apr. 9, 2019

(54) DATA BREAKPOINT WITH COMPACTING GARBAGE COLLECTION

(71) Applicant: Microsoft Technology Licensing, LLC, Redmond, WA (US)

(72) Inventors: Ying Hung Au, Redmond, WA (US); Zhicheng Zhu, Bellevue, WA (US)

(73) Assignee: MICROSOFT TECHNOLOGY LICENSING, LLC., Redmond, WA (US)

( * ) Notice: Subject to any disclaimer, the term of this patent is extended or adjusted under 35 U.S.C. 154(b) by 140 days.

(21) Appl. No.: 15/360,636

(22) Filed: Nov. 23, 2016

(65) Prior Publication Data

US 2018/0143892 A1    May 24, 2018

(51) Int. Cl.
*G06F 11/00* (2006.01)
*G06F 11/36* (2006.01)

(52) U.S. Cl.
CPC ...... *G06F 11/3624* (2013.01); *G06F 11/3636* (2013.01); *G06F 11/3664* (2013.01)

(58) Field of Classification Search
CPC ............ G06F 11/3624; G06F 11/3636; G06F 11/3664
See application file for complete search history.

(56) References Cited

U.S. PATENT DOCUMENTS

| 7,162,664 B2 | 1/2007 | Haselden et al. |
| 7,272,826 B2 | 9/2007 | Bates et al. |
| 7,360,204 B2 | 4/2008 | Bates et al. |
| 2011/0302183 A1* | 12/2011 | Van De Vanter ......... G06F 9/44 707/758 |
| 2014/0237452 A1* | 8/2014 | Wischik .............. G06F 11/3632 717/125 |
| 2015/0378870 A1 | 12/2015 | Marron et al. |

OTHER PUBLICATIONS

"Java SE", http://web.archive.org/web/20100913171801/http://www.oracle.com/technetwork/java/javase/6u14-137039.html, Sep. 13, 2010, 7 pages.
JS, Steve, "Data Breakpoints", https://blogs.msdn.microsoft.com/stevejs/2005/10/27/data-breakpoints/, Oct. 27, 2005, 5 pages.
Koch, et al., "Breakpoints and Breakpoint Detection in Source-Level Emulation", In Journal of ACM Transactions on Design Automation of Electronic Systems, vol. 3 Issue 2, Apr. 1998, 209-230 pages.

(Continued)

*Primary Examiner* — Michael Maskulinski

(57) ABSTRACT

Traditionally, setting a data breakpoint in a debugger for an execution environment that uses compacting garbage collection is ineffective as a compacting garbage collector moves data around in memory as part of its compaction process. Traditional debugging approaches such as tracing each insertion, etc. are impractical because of the quantity of operations encountered in a typical program. Described herein is a data breakpoint for a compacting garbage collection environment in which data breakpoints are disabled while the garbage collector is running, creating notifications for move operations, batching the notifications, retargeting data breakpoints and using the batched notifications to re-enable the disabled breakpoints.

16 Claims, 4 Drawing Sheets

(56) References Cited

OTHER PUBLICATIONS

Ertan, Ersin, "Android Runtime Virtual Machine and Garbage Collection", http://ersingroovygradle.blogspot.in/2015/01/android-runtime-virtual-machine-and.html, Jan. 1, 2015, 2 pages.

Burger, Alexander, "The PicoLisp Reference", http://web.archive.org/web/20131113180446/http:/folk.uio.no/kleiser/pico/doc/ref.html, Nov. 13, 2013, 26 pages.

Zhang, et al., "BPGen: An Automated Breakpoint Generator for Debugging", In Proceedings of the 32nd ACM/IEEE International Conference on Software Engineering—vol. 2, May 2, 2010, 271-274 pages.

Wahbet, et al., "Practical Data Breakpoints: Design and Implementation", In Proceedings of the ACM SIGPLAN'93 Conference on Programming Language Design and Implementation, Jun. 23, 1993, 1-12 pages.

\* cited by examiner

DATA BREAKPOINT WITH COMPACTING GARBAGE COLLECTION

BACKGROUND

In software development, a breakpoint is typically placed in a program to find out why the program is not operating as expected (i.e., to find bugs). In some debuggers, when the breakpoint is encountered, execution of the program pauses and the user can inspect the values of various registers, memory locations, and so on. An instruction breakpoint can be used to interrupt a running program immediately before the execution of a user-specified instruction. A conditional breakpoint can be used to pause a program when a user-supplied condition is encountered. A data breakpoint or watchpoint can be used to interrupt a running program when a specified location in memory is read or written to. In languages with compacting garbage collectors, a data breakpoint typically does not work because data is moved by the garbage collector during the garbage collection cycle.

In computer science, garbage collection (GC) is a type of automatic memory management in which the garbage collector periodically reclaims memory occupied by data that is no longer needed by the program. In manual (as opposed to automatic) memory management, a programmer explicitly specifies what locations in memory are de-allocated. A traditional garbage collector marks all the reachable locations in an area of memory and reclaims for re-use all the other locations in the area of memory.

A compacting garbage collector moves the contents of all the reachable locations together to make memory usage more efficient. Use of a compacting garbage collector enables more efficient use of memory because as the program runs, memory becomes fragmented. Eventually the useable portions of memory become so small that they can no longer be used. The compacting garbage collector moves the data that is needed so that the area of memory used is more compact. Thus, larger portions of free space result when garbage collected areas are reclaimed. That is, the data that is still in use can be re-written to an area of memory so that a larger contiguous area of memory can be reclaimed. One effect of this approach is that the address where a certain piece of data is stored can change during the execution of the program as a result of garbage collection. This makes the traditional use of data breakpoints ineffective because the breakpoint can point to an area of memory that was reclaimed by the garbage collector and may even have been re-used by the program so that the breakpoint no longer points to the data it pointed to before the garbage collector ran.

SUMMARY

A data breakpoint can be set so that whenever data at a specified location in memory is changed, the program is paused. A data breakpoint can be set even in an execution environment in which a compacting garbage collector operates. The data breakpoint can operate correctly even when the data is moved from one location in memory to another location in memory during garbage collection. Data breakpoints can be disabled while the garbage collector is running. The garbage collector can create a notification for each time a movement of data occurs as a result of garbage collection. When garbage collection is complete, all the data movement notifications can be batched together into a single notification and sent to the debugger. The debugger can mark locations of interest by, for example, creating a weak reference to any data that has a breakpoint attached to it, enabling the garbage collector to filter out notifications pertaining to data that is not of interest to the debugger (e.g., does not have a breakpoint attached to it). The debugger can change the address to which the data breakpoint points for the remaining data. The notifications can be used to re-enable the disabled breakpoints.

In some cases the debugger can mark a location to which a data breakpoint is attached by creating a weak reference to it. A garbage collector determines what can be garbage collected by determining everything that is not garbage. Anything else can be garbage collected. For example, if data is a global variable it is not garbage and cannot be garbage collected because it is possible to access a global variable anytime the program is running. Similarly, if data is a local variable that is being accessed currently, the local variable cannot be garbage. Any data that is referenced by data that is not garbage is also not garbage. The reference keeps the data (e.g., an object, etc.) alive. These types of references are strong references. A weak reference is a reference that does not keep data alive. Weak references are not used very often because use of a weak reference makes it possible to have non-garbage data refer to data that is not alive. This data may be garbage collected in the next cycle of garbage collection. A weak reference is a garbage collector concept and weak references are managed by the garbage collector.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Overview

Figure 1:
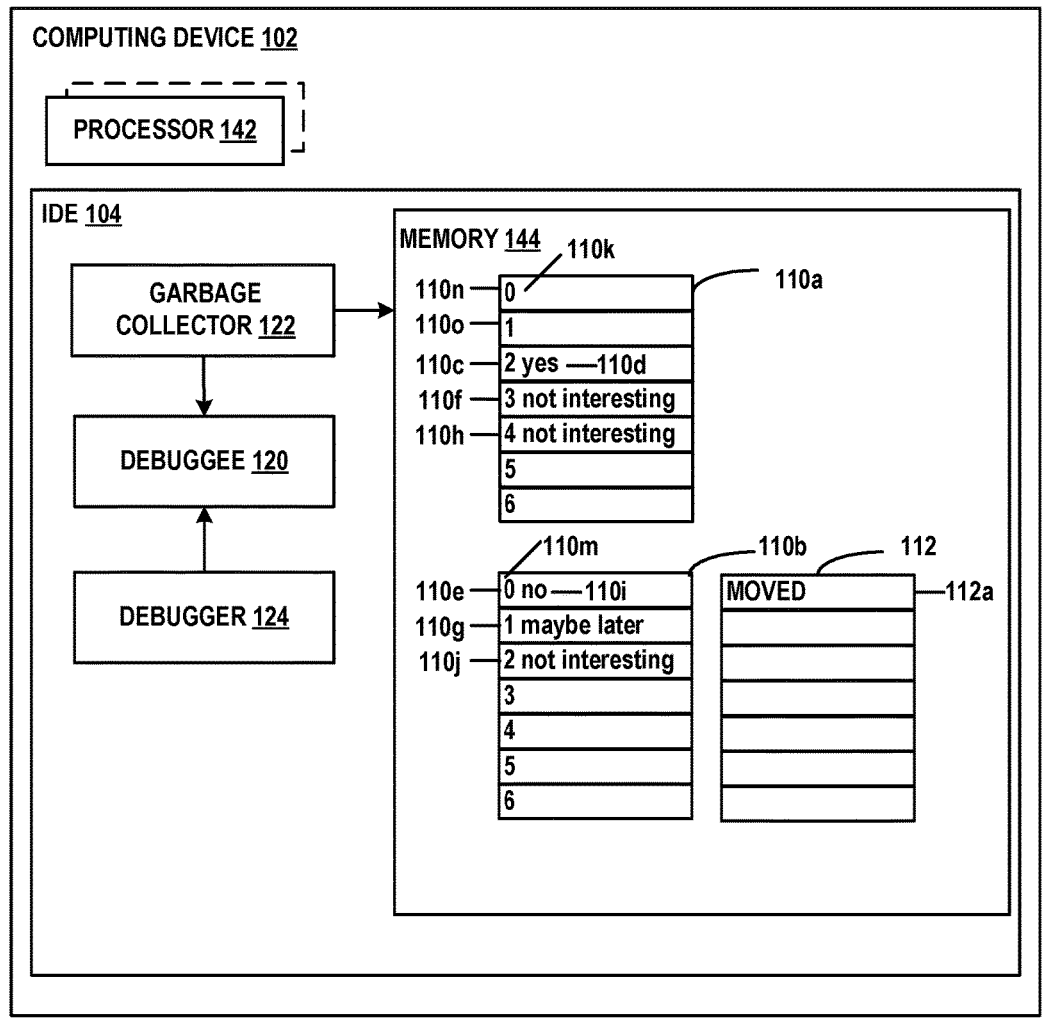
FIG. 1 illustrates a system 100 comprising an example of a system in which a data breakpoint is used in accordance with aspects of the subject matter described herein.

It can be especially difficult to determine when data gets changed in a program that executes in an environment that uses compacting garbage collection. For example, suppose a developer is writing a program that builds a binary search tree. In a binary search tree, the values of the left hand child node of a parent node have to be smaller than the values of the right hand child node of the parent node. Suppose that, after the data structure is built, a user issues a query on the tree and finds out that the tree does not return the correct value even though data is inserted into the tree. Suppose the developer runs the program under a debugger and is able to determine that a particular value at a particular node in the tree is not correct. Suppose the developer has deduced that the tree is not built correctly, that is, that an invariant condition no longer holds true, but does not understand why.

To debug the building of the tree, the developer could place a trace on every insertion made into the tree, however, this may not be practical because of the quantity of insertions that are made into the tree. A breakpoint could be set on the gets and sets of the node's left and right pointers, however, this may not be practical either because of the quantity of gets and sets that are made. A conditional breakpoint could be used, but that is likely to greatly reduce the speed of execution, and moreover, such a condition is difficult to write. The code could be changed to add an invariant assertion, but such an assertion is also likely to take a long time to execute. (An assertion is a statement a programmer can put in a program "asserting" that a certain condition is true. The effect of this is that whenever the condition being asserted is not actually true according to the computer, the program will crash, and when it does, the context can provide an understanding of why the program crashed.) Hence, no known existing mechanism lends itself to solving this problem in a practical way.

In accordance with aspects of the subject matter described herein, a data breakpoint can be set to pause execution of a program whenever data at a breakpointed location is changed, even in an execution environment in which a compacting garbage collector operates. Ordinarily, this would not work because once the data is moved by the compacting garbage collector, the breakpoint can point to a location that no longer contains the data the breakpoint used to point to. In the example above, if the developer knew which node caused the error, it would be easier to find and fix the bug. The subject matter described herein can be used to pause the program and invoke the debugger when that node is changed. In accordance with aspects of the subject matter described herein, a data breakpoint can be used. It can be based on a hardware interrupt making it very fast. Traditionally, use of a data breakpoint only works in environments in which data is not moved as part of the garbage collection. In execution environments including but not limited to .NET languages and the Java Execution Environment which use a compacting garbage collector, data is moved around in memory during garbage collection and therefore data breakpoints do not typically work because the data breakpoint is fixed, (refers to a particular location in memory) but the data can be moved around in memory as part of the compacting feature of the garbage collector.

To address the possibility that data can be moved, data breakpoints can be disabled while the garbage collector is compacting. This avoids false positives. In this context a false positive can be pausing the program when the data in the memory location pointed to by the breakpoint is not helpful in debugging because the information that is helpful to a developer is not that the data was moved but that the data was changed. The garbage collector can tell the debugger whenever a movement of data occurs so that the debugger can change the address to which the data breakpoint points. (This is called retargeting the data breakpoint). This approach can be very slow because of the number of potential movements of data.

In accordance with some aspects of the subject matter described herein, a number of data move notifications can be batched into a single notification. Batching together all the data move notifications for a compaction cycle into a single notification when the compaction cycle completes can improve performance. The move notification(s) can also be used to re-enable the (potentially updated) data breakpoints. Because data that has been moved is only of interest to the debugger if it has a breakpoint associated with it, the debugger can mark locations of interest by, for example, creating a weak reference to any data that has a breakpoint attached to it. Marking locations associated with a data breakpoint can enable the garbage collector to filter out the data movements that are not associated with a data breakpoint. When the program resumes execution a pause in execution triggered by encountering a data breakpoint can be implemented using a hardware interrupt that causes an exception on the debuggee.

Data Breakpoint with Compacting Garbage Collection

FIG. 1 illustrates a system 100 comprising an example of a system in which a data breakpoint is used in a programming language that utilizes compact garbage collection in accordance with aspects of the subject matter described herein. All or portions of system 100 may reside on one or more computers or computing devices such as the computers described below with respect to FIG. 3. System 100 or portions thereof may be provided as a stand-alone system or as a plug-in or add-in. System 100 may execute wholly or partially within an IDE such as IDE 104 or can execute wholly or partially outside an IDE. An IDE can be an IDE such as the one described with respect to FIG. 4 or can be any other IDE. All or portions of system 100 may be implemented as a plug-in or add-on.

System 100 or portions thereof may include information obtained from a service (e.g., in the cloud) or may operate in a cloud computing environment. A cloud computing environment can be an environment in which computing services are not owned but are provided on demand. For example, information may reside on multiple devices in a networked cloud and/or data can be stored on multiple devices within the cloud.

System 100 can include one or more computing devices such as, for example, computing device 102. Contemplated computing devices include but are not limited to desktop computers, tablet computers, laptop computers, notebook computers, personal digital assistants, smart phones, cellular telephones, mobile telephones, sensors, server computers, client computers and so on. A computing device such as computing device 102 can include one or more processors such as processor 142, etc., and a memory such as memory 144 that communicates with the one or more processors.

System 100 may include one or more program modules that when loaded into the memory and accessed by the one or more processors cause the processor to perform the action or actions attributed to the one or more program modules. The processor(s) may be configured to perform the action or actions attributed to the one or more program modules. System 100 may include any one of or any combination of any number of the following: a debugger such as debugger 124 a program process being debugged such as debuggee 120, and/or a garbage collector such as garbage collector 122.

In FIG. 1, area of memory 110a represents an area of memory used by a program to store data before a cycle of garbage collection executes. Area 110b represents the same area of memory after a cycle of garbage collection completes. Numerals 0 (110k, 110m), 1, 2, 3, 4, 5 and 6 in each area of memory represent offsets from some starting location. Hence offset 0 (110k) in area 110a (location 110n) represents the same location in memory as offset 0 (110m) in area 110b (location 110e), offset 1 in area 110a (location 110o) represents the same location in memory as offset 1 in area 110b (location 110g) and so on. A debugger 124 can set a data breakpoint for a particular location in memory, (e.g., some location x, such as area 110a offset 2 110c) the data of interest to the debugger residing in that location in the memory. A user of the debugger may specify what the data of interest to the debugger is. The debugger 124 can mark the location x, area 110a offset 2 110c having contents "yes" 110d to indicate that that location in memory is associated with a data breakpoint. The data in area 110a offset 4 110h and area 110a offset 3 110f are not associated with data breakpoints. The debugger 124 can notify the debuggee 120 that a breakpoint has been set for the location in memory area 110a offset 2 110c that is associated with the data breakpoint.

The debuggee (e.g., debugee 120) can receive a notification from the debugger (e.g., debugger 124) that a breakpoint has been set for a location x, area 110a offset 2 110c. The notification from the debugger can include a location at which the data is located (e.g., area 110a offset 2 110c). The debuggee can mark that location with a marker that indicates that this location is associated with a breakpoint and is therefore of interest to the debugger. The debuggee may mark the location by creating a weak reference to location x. The debuggee can run.

The garbage collector 122 can be a compacting garbage collector. In accordance with some aspects of the subject matter described herein, a compacting garbage collector can be utilized when the debuggee is run. At some point or points, while the debuggee is running, a garbage collector 122 can start to run. When the garbage collector 122 starts to run, all data breakpoints can be disabled. The garbage collector 122 may move data from a first location to a second location as part of its compacting function. For example, the garbage collector 122 may move the data at location area 110a offset 2 110c to location area 110b offset 0 110e. Similarly, the garbage collector may move the data at location area 110a offset 3 110f to location area 110b offset 1 110g. The garbage collector 122 may move the data at location area 110a offset 4 110h to location area 110b offset 2 110j.

In accordance with some aspects of the subject matter described herein, if the first location is associated with a breakpoint, a notification can be created. For example, because the data originally at area 110a offset 2 110c is marked as associated with a breakpoint, a notification (e.g., notification 112a) may be created for location area 110a offset 2 110c. Because the data originally at area 110a offset 3 110f and offset 4 110h are not associated with a breakpoint, a notification is not created for location area 110a offset 3 110f and location area 110a offset 4 110h. The notification can include one or both of: the location (e.g., location x) at which the data was located before the garbage collector 122 moved it and the location (e.g., location y) at which the data is located after the garbage collector 122 moved it.

Alternatively, notifications can be created for all data that has been moved by the garbage collector and an additional piece of information can be included in the notification that indicates that this notification is associated with a breakpointed location. The can enable the debugger to ignore the notifications that are not associated with breakpointed locations. The notification can include one or both of: the location (e.g., location x) at which the data was located before the garbage collector 122 moved it and the location (e.g., location y) at which the data is located after the garbage collector 122 moved it.

The notification can be added to a batch of notifications such as notifications 112. Periodically (e.g., when the garbage collection cycle is complete) the batch of notifications 112 can be sent to the debugger. The debugger 124 can update a breakpoint address to point to a location to which the data has been moved by the garbage collector (e.g., to location y, area 110b offset 0 110e in the example). The debugger 124 can notify the debuggee 120 that the location of the breakpoint has changed and can provide the updated location to the debuggee 120. In accordance with some aspects of the subject matter described herein, in response to detecting a change in the content of the location (e.g., "yes" 110d has changed to "no"110i) associated with the breakpoint, a pause can be triggered and control can be transferred to the debugger. The pause may be triggered by a hardware interrupt. The debugger can then display debug information as is known in the art.

Figure 2:
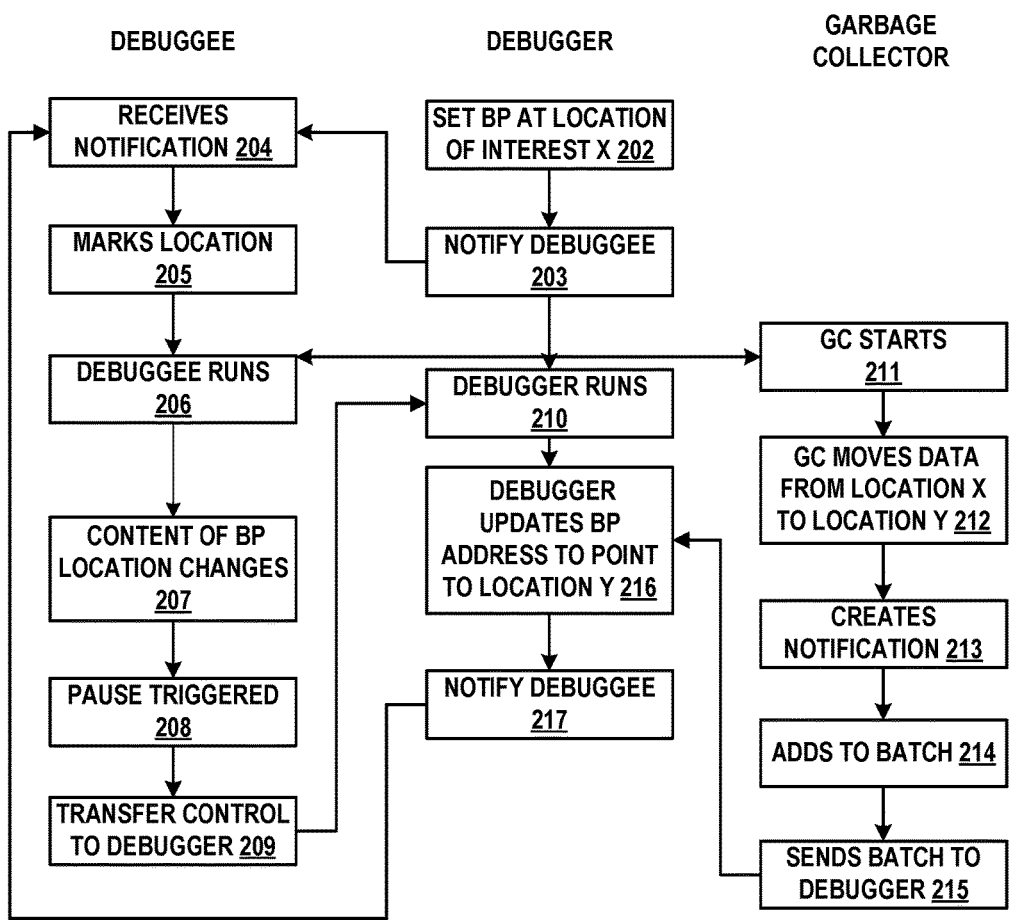
FIG. 2 illustrates an example of a method 200 for using data breakpoints in accordance with aspects of the subject matter described herein.

FIG. 2 illustrates an example of a method 200 for using a data breakpoint in an environment using a compacting garbage collector in accordance with aspects of the subject matter disclosed herein. The method described in FIG. 2 can be practiced by a system such as but not limited to the one described with respect to FIG. 1. While method 200 describes a series of operations that are performed in a sequence, it is to be understood that method 200 is not limited by the order of the sequence depicted. For instance, some operations may occur in a different order than that described. In addition, one operation may occur concurrently with another operation. In some instances, not all operations described are performed. In some instances, not all operations performed are illustrated.

At operation 202 a data breakpoint for a particular location (e.g., location x) in memory, the location in memory including the data of interest, can be set in a debugger. In accordance with some aspects of the subject matter described herein, a compacting garbage collector can be utilized when the program is run. At operation 203, the debugger can notify the debuggee (the program being debugged) that a data breakpoint for the location (e.g., location x) has been set. At operation 204 the debuggee can receive the notification from the debugger. The notification from the debugger can include a location at which the data is located. At operation 205, the debuggee process can mark the location received in the notification as having a breakpoint associated with it. The debuggee may mark the location by having a weak reference to location x. At operation 206 the debuggee can execute.

At operation 208 in response to detecting a change in content at a location to which a breakpoint is attached (e.g., at location x before a garbage collector runs or at location y after a garbage collector runs, for example) at operation 207 a pause can be triggered. In accordance with some aspects of the subject matter described herein, the pause can be triggered by hardware. At operation 209 control can be transferred to the debugger. At operation 210, the debugger can run. Meanwhile, while the debuggee is running at operation 206, a garbage collector can start to run at operation 211. When the garbage collector starts to run, all breakpoints can be disabled. The garbage collector can be a compacting garbage collector. At operation 212 the garbage collector may move data from a first location (e.g., location x) to a second location (e.g., location y). If the first location is associated with a breakpoint a notification can be created at operation 213. The notification can include the location (e.g., location x) at which the data was located before the garbage collector moved it and the location (e.g., location y) at which the data of interest to the debugger is located after the garbage collector moved it.

At operation 214 the notification can be added to a batch of notifications. At operation 215 when the garbage collection cycle is complete at operation 215 the batch can be sent to the debugger. At operation 216 the debugger can update the breakpoint from the location at which the data was located before the garbage collector ran to the location to which the data was moved while the garbage collector ran. The breakpoints can be re-enabled (e.g., by the debugger). At operation 217 the debugger can notify the debuggee that the location of data of interest to the debugger has changed. Processing can continue at operation 204 in the debuggee.

Described herein is a computing device comprising a processor, and a memory connected to the processor where the processor is configured to set a data breakpoint for a location in the memory comprising data of interest to a debugger, receive a notification of a data move operation made by a compacting garbage collector and update a breakpoint address to point to a location to which the data of interest to the debugger has been moved by the compacting garbage collector. The processor may be configured to receive control from the debuggee in response to a data breakpoint being encountered. The processor may be further configured to mark the location to indicate that the location in memory is associated with the data breakpoint. The processor may be further configured to notify a debuggee that the location of the breakpointed data has changed. The processor may be further configured to provide the updated location for the data breakpoint to the debuggee. The processor may be further configured to update a breakpoint address to point to a location to which the data of interest has been moved by the compacting garbage collector. The processor may be further configured to in response to receiving a notification from the garbage collector, re-enabling the data breakpoint disabled by the garbage collector.

Described herein is a method comprising configuring a processor of a computing device executing in a compacting garbage collection environment to receive a notification from a debugger executing in a compacting garbage collection environment, that a data breakpoint has been set for a location in memory comprising data of interest to a debugger and mark the location with a marker that indicates that the location in memory is associated with the data breakpoint. The notification can comprise a location in memory at which the breakpointed data is located before a garbage collection cycle is initiated. The notification from the debugger can comprise a location in memory to which data of interest to the debugger has been moved by a compacting garbage collector after the garbage collection cycle has run. In response to detecting a change in content of the location in memory associated with the data breakpoint a pause can be triggered. The pause can be triggered by a hardware interrupt. Control can be transferred to the debugger.

Described herein is a computing device comprising a processor, a memory, the memory connected to the processor; the processor configured to initiate garbage collection and to disable data breakpoints in a program executing under a debugger. The processor can be further configured to in response to moving data breakpointed data from a first location in the memory to a second location in the memory, generating a notification of the move. The notification of the move can be sent to a debugger. A group of move notifications can be batched into a single notification. The single notification comprising a batch of move notifications can be sent to the debugger. The notification can include a location at which the breakpointed data was located before the garbage collector moved it. The notification can include a location at which the data is located after the garbage collector moved it.

Example of a Suitable Computing Environment

Figure 3:
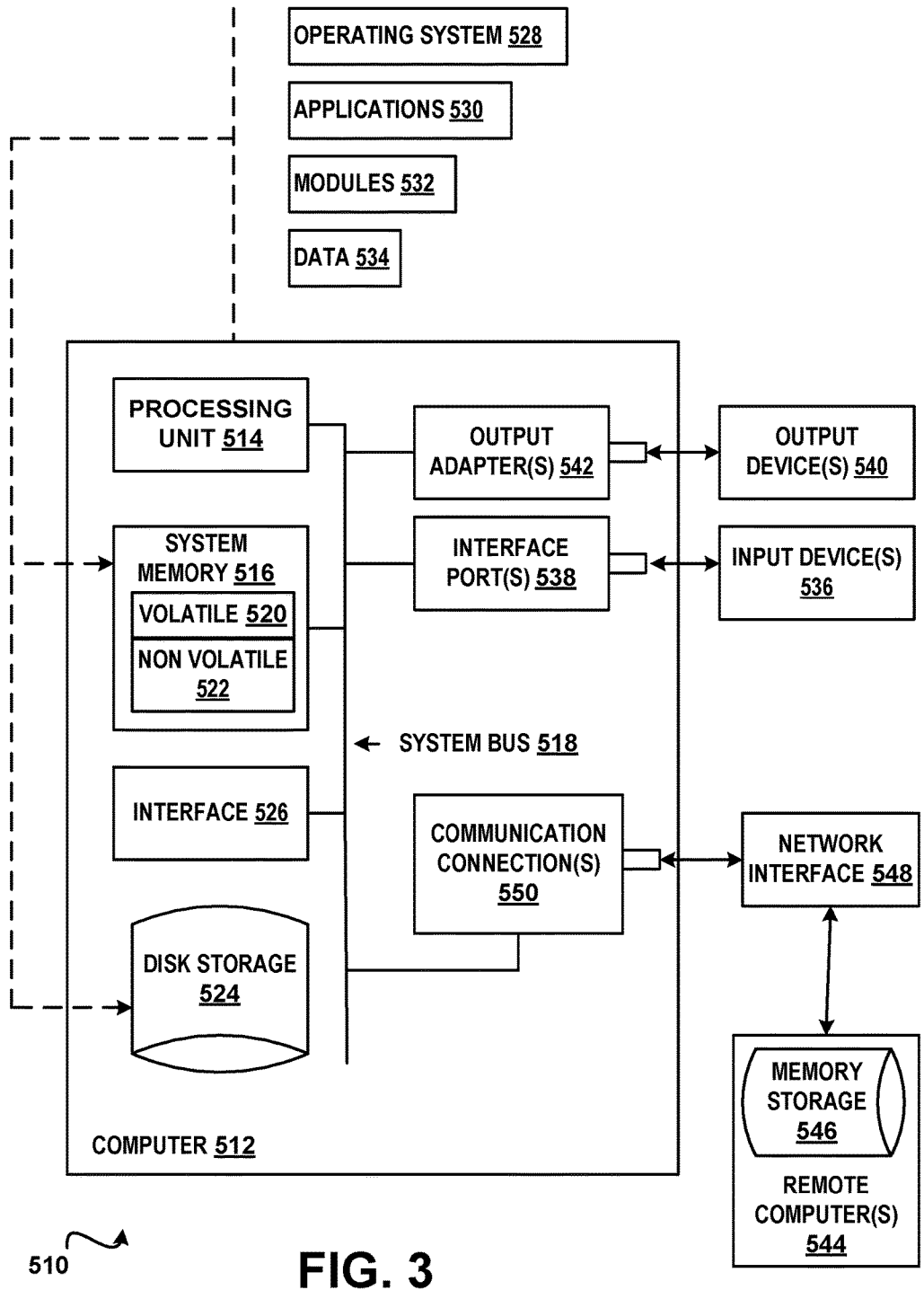
FIG. 3 is a block diagram of an example of a computing environment in accordance with aspects of the subject matter described herein.

In order to provide context for various aspects of the subject matter disclosed herein, FIG. 3 and the following discussion are intended to provide a brief general description of a suitable computing environment 510 in which various embodiments of the subject matter disclosed herein may be implemented. While the subject matter disclosed herein is described in the general context of computer-executable instructions, such as program modules, executed by one or more computers or other computing devices, those skilled in the art will recognize that portions of the subject matter disclosed herein can also be implemented in combination with other program modules and/or a combination of hardware and software. Generally, program modules include routines, programs, objects, physical artifacts, data structures, etc. that perform particular tasks or implement particular data types. Typically, the functionality of the program modules may be combined or distributed as desired in various embodiments. The computing environment 510 is only one example of a suitable operating environment and is not intended to limit the scope of use or functionality of the subject matter disclosed herein.

With reference to FIG. 3, a computing device in the form of a computer 512 is described. Computer 512 may include at least one processing unit 514, a system memory 516, and a system bus 518. The at least one processing unit 514 can execute instructions that are stored in a memory such as but not limited to system memory 516. The processing unit 514 can be any of various available processors. For example, the processing unit 514 can be a graphics processing unit (GPU). The instructions can be instructions for implementing functionality carried out by one or more components or modules discussed above or instructions for implementing one or more of the methods described above. Dual microprocessors and other multiprocessor architectures also can be employed as the processing unit 514. The computer 512 may be used in a system that supports rendering graphics on a display screen. In another example, at least a portion of the computing device can be used in a system that comprises a graphical processing unit.

The system memory 516 may include volatile memory 520 and nonvolatile memory 522. Nonvolatile memory 522 can include read only memory (ROM), programmable ROM (PROM), electrically programmable ROM (EPROM) or flash memory. Volatile memory 520 may include random access memory (RAM) which may act as external cache memory. The system bus 518 couples system physical artifacts including the system memory 516 to the processing unit 514. The system bus 518 can be any of several types including a memory bus, memory controller, peripheral bus, external bus, or local bus and may use any variety of available bus architectures. Computer 512 may include a data store accessible by the processing unit 514 by way of the system bus 518. The data store may include executable instructions, 3D models, materials, textures and so on for graphics rendering.

Computer 512 typically includes a variety of computer readable media such as volatile and nonvolatile media, removable and non-removable media. Computer readable media may be implemented in any method or technology for storage of information such as computer readable instructions, data structures, program modules or other data. Computer readable media include computer-readable storage media (also referred to as computer storage media) and communications media. Computer storage media includes physical (tangible) media, such as but not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices that can store the desired data and which can be accessed by computer 512. Communications media include media such as, but not limited to, communications signals, modulated carrier waves or any other intangible media which can be used to communicate the desired information and which can be accessed by computer 512.

It will be appreciated that FIG. 3 describes software that can act as an intermediary between users and computer resources. This software may include an operating system 528 which can be stored on disk storage 524, and which can allocate resources of the computer 512. Disk storage 524 may be a hard disk drive connected to the system bus 518 through a non-removable memory interface such as interface 526. System applications 530 take advantage of the management of resources by operating system 528 through program modules 532 and program data 534 stored either in system memory 516 or on disk storage 524. It will be appreciated that computers can be implemented with various operating systems or combinations of operating systems.

A user can enter commands or information into the computer 512 through an input device(s) 536. Input devices 536 include but are not limited to a pointing device such as a mouse, trackball, stylus, touch pad, keyboard, microphone, voice recognition and gesture recognition systems and the like. These and other input devices connect to the processing unit 514 through the system bus 518 via interface port(s) 538. An interface port(s) 538 may represent a serial port, parallel port, universal serial bus (USB) and the like. Output devices(s) 540 may use the same type of ports as do the input devices. Output adapter 542 is provided to illustrate that there are some output devices 540 like monitors, speakers and printers that require particular adapters. Output adapters 542 include but are not limited to video and sound cards that provide a connection between the output device 540 and the system bus 518. Other devices and/or systems or devices such as remote computer(s) 544 may provide both input and output capabilities.

Computer 512 can operate in a networked environment using logical connections to one or more remote computers, such as a remote computer(s) 544. The remote computer 544 can be a personal computer, a server, a router, a network PC, a peer device or other common network node, and typically includes many or all of the elements described above relative to the computer 512, although only a memory storage device 546 has been illustrated in FIG. 3. Remote computer(s) 544 can be logically connected via communication connection(s) 550. Network interface 548 encompasses communication networks such as local area networks (LANs) and wide area networks (WANs) but may also include other networks. Communication connection(s) 550 refers to the hardware/software employed to connect the network interface 548 to the bus 518. Communication connection(s) 550 may be internal to or external to computer 512 and include internal and external technologies such as modems (telephone, cable, DSL and wireless) and ISDN adapters, Ethernet cards and so on.

It will be appreciated that the network connections shown are examples only and other means of establishing a communications link between the computers may be used. One of ordinary skill in the art can appreciate that a computer 512 or other client device can be deployed as part of a computer network. In this regard, the subject matter disclosed herein may pertain to any computer system having any number of memory or storage units, and any number of applications and processes occurring across any number of storage units or volumes. Aspects of the subject matter disclosed herein may apply to an environment with server computers and client computers deployed in a network environment, having remote or local storage. Aspects of the subject matter disclosed herein may also apply to a standalone computing device, having programming language functionality, interpretation and execution capabilities.

Figure 4:
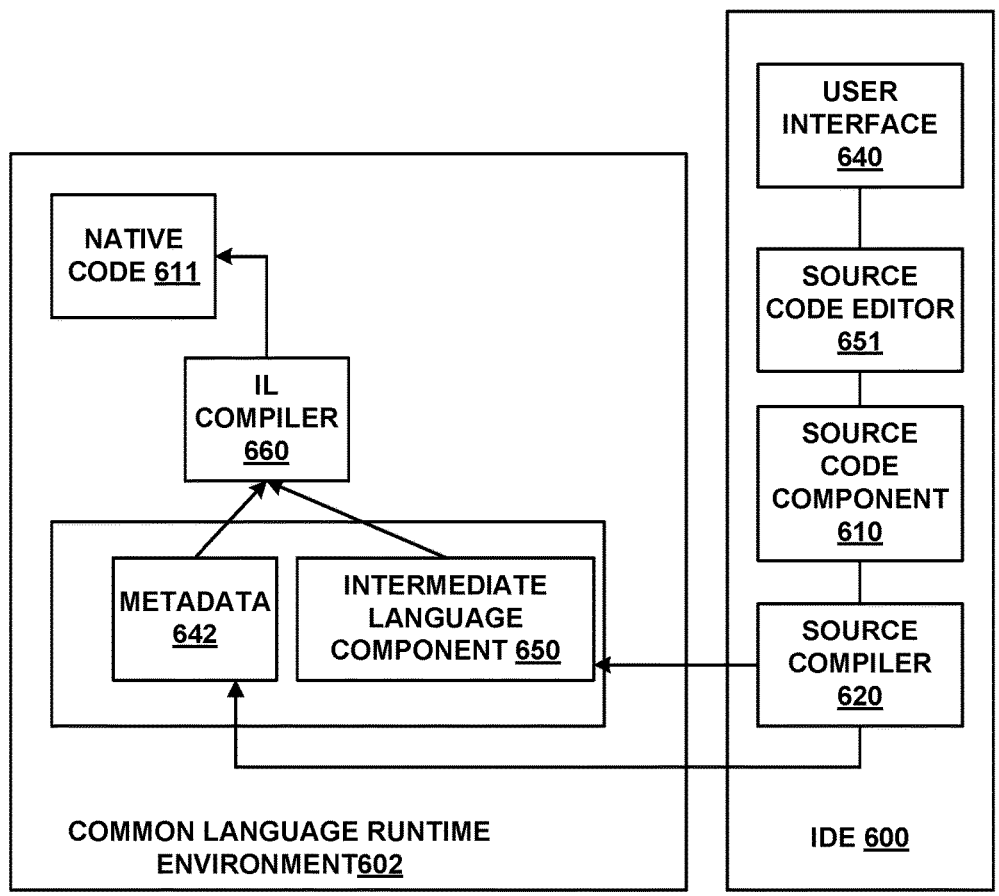
FIG. 4 is a block diagram of an example of an integrated development environment in accordance with aspects of the subject matter described herein.

FIG. 4 illustrates an integrated development environment (IDE) 600 and Common Language Runtime Environment 602. An IDE 600 may allow a user (e.g., developer, programmer, designer, coder, etc.) to design, code, compile, test, run, edit, debug or build a program, set of programs, web sites, web applications, and web services in a computer system. Software programs can include source code (component 610), created in one or more source code languages (e.g., Visual Basic, Visual J#, C++. C#, J#, Java Script, APL, COBOL, Pascal, Eiffel, Haskell, ML, Oberon, Perl, Python, Scheme, Smalltalk and the like). The IDE 600 may provide a native code development environment or may provide a managed code development that runs on a virtual machine or may provide a combination thereof. The IDE 600 may provide a managed code development environment using the .NET framework. An intermediate language component 650 may be created from the source code component 610 and the native code component 611 using a language specific source compiler 620 and the native code component 611 (e.g., machine executable instructions) is created from the intermediate language component 650 using the intermediate language compiler 660 (e.g. just-in-time (JIT) compiler), when the application is executed. That is, when an IL application is executed, it is compiled while being executed into the appropriate machine language for the platform it is being executed on, thereby making code portable across several platforms. Alternatively, in other embodiments, programs may be compiled to native code machine language (not shown) appropriate for its intended platform.

A user can create and/or edit the source code component according to known software programming techniques and the specific logical and syntactical rules associated with a particular source language via a user interface 640 and a source code editor 651 in the IDE 600. Thereafter, the source code component 610 can be compiled via a source compiler 620, whereby an intermediate language representation of the program may be created, such as assembly 630. The assembly 630 may comprise the intermediate language component 650 and metadata 642. Application designs may be able to be validated before deployment.

The various techniques described herein may be implemented in connection with hardware or software or, where appropriate, with a combination of both. Thus, the methods and apparatus described herein, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing aspects of the subject matter disclosed herein. As used herein, the term "machine-readable medium" shall be taken to exclude any mechanism that provides (i.e., stores and/or transmits) any form of propagated signals. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects, e.g., through the use of a data processing API or the like, may be implemented in a high level procedural or object oriented programming language to communicate with a computer system. However, the program(s) can be implemented in assembly or machine language, if desired. In any case, the language may be a compiled or interpreted language, and combined with hardware implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A computing device comprising:
a processor:
a memory connected to the processor; the processor configured to:
set a data breakpoint for data of interest to a debugger located in a first location in the memory;
receive a notification of a data move operation made by a compacting garbage collector;
update a breakpoint address to point to a second location in the memory to which the data of interest to the debugger has been moved by the compacting garbage collector; and
in response to receiving a notification from the compacting garbage collector, enabling the data breakpoint, wherein the data breakpoint was disabled by the compacting garbage collector.

2. The computing device of claim 1, the processor further configured to:
receive control from a debuggee in response to the data breakpoint being encountered.

3. The computing device of claim 1, the processor further configured to:
mark the first location to indicate that the first location is associated with the data breakpoint.

4. The computing device of claim 1, the processor further configured to:
notify a debuggee that the first location of the data of interest to the debugger has changed.

5. The computing device of claim 1, the processor further configured to:
provide the second location for the data breakpoint to a debuggee.

6. A method comprising configuring a processor of a computing device executing in a compacting garbage collection environment to:
receive a first notification from a debugger executing in a compacting garbage collection environment, that a data breakpoint has been set for a first location in memory comprising data of interest to a debugger;
mark the first location with a marker that indicates that the first location in memory is associated with the data breakpoint;
in response to detecting a change in content of the first location, triggering a pause, wherein the pause is triggered by a hardware interrupt.

7. The method of claim 6, wherein the first notification comprises a location in memory at which the data breakpoint is located before a garbage collection cycle is initiated.

8. The method of claim 7, wherein the first notification comprises a location in memory to which data of interest to the debugger has been moved by a compacting garbage collector after the garbage collection cycle has run.

9. The method of claim 6, further comprising:
upon triggering the pause, transferring control to the debugger.

10. A computing device comprising:
a processor;
a memory;
the memory connected to the processor; the processor configured to:
initiate garbage collection; and
disable a data breakpoint in a program executing under a debugger,
wherein the garbage collection performs a data move operation associated with the disabled data breakpoint.

11. The computing device of claim 10, the processor further configured to:
in response to moving data associated with the disabled data breakpoints from a first location in the memory to a second location in the memory, generating a notification of the move.

12. The computing device of claim 11, the processor further configured to:
send the notification of the move to the debugger.

13. The computing device of claim 11, the processor further configured to:
batch a group of move notifications into a single notification.

14. The computing device of claim 13, the processor further configured to:
send the single notification comprising a batch of move notifications to the debugger.

15. The computing device of claim 11, wherein the notification comprises a location at which the data breakpoint data was located before a garbage collector moved it.

16. The computing device of claim 11, wherein the notification comprises a location at which the data associated with the disabled data breakpoint is located after a garbage collector moved it.

* * * * *